(12) United States Patent
Maeda et al.

(10) Patent No.: US 9,693,380 B2
(45) Date of Patent: *Jun. 27, 2017

(54) TRANSMITTING SERVICE INFORMATION TO A PLURALITY OF USER DEVICES USED BY A SINGLE USER

(71) Applicant: FUJI XEROX CO., LTD., Tokyo (JP)

(72) Inventors: Yasutoshi Maeda, Kanagawa (JP); Nobuo Iwata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/334,812

(22) Filed: Oct. 26, 2016

(65) Prior Publication Data

US 2017/0048907 A1 Feb. 16, 2017

Related U.S. Application Data

(63) Continuation of application No. 14/476,987, filed on Sep. 4, 2014, now Pat. No. 9,509,781.

(30) Foreign Application Priority Data

Mar. 19, 2014 (JP) ................................ 2014-055865

(51) Int. Cl.

| G06F 15/16 | (2006.01) |
|---|---|
| H04W 76/02 | (2009.01) |
| H04W 4/00 | (2009.01) |
| H04W 12/06 | (2009.01) |
| H04L 29/06 | (2006.01) |
| H04L 29/08 | (2006.01) |

(52) U.S. Cl.
CPC ........... *H04W 76/023* (2013.01); *H04L 63/08* (2013.01); *H04L 67/24* (2013.01); *H04W 4/008* (2013.01); *H04W 12/06* (2013.01)

(58) Field of Classification Search
None
See application file for complete search history.

(56) References Cited

U.S. PATENT DOCUMENTS

2013/0124309 A1* 5/2013 Traasdahl ............... H06L 67/22
705/14.49
2014/0068710 A1* 3/2014 Lau ......................... G06F 21/00
726/3

(Continued)

FOREIGN PATENT DOCUMENTS

| JP | 2001-067202 A | 3/2001 |
|---|---|---|
| JP | 2002-189707 A | 7/2002 |
| JP | 2004-341736 A | 12/2004 |

*Primary Examiner* — Padma Mundur
(74) *Attorney, Agent, or Firm* — Sughrue Mion, PLLC

(57) ABSTRACT

An information processing apparatus includes: a user determination unit that determines whether or not plural user devices are used by a single user on the basis of information transmitted from the plural user devices; a storage unit that stores information of the plural user devices determined to be used by the single user as a set of user devices; a selection unit that selects a second user device to which a service is to be provided in the case where a first user device that requests the service and the second user device are both included in the same set of user devices; and a transmitting unit that transmits service information to the first and the second user device.

2 Claims, 12 Drawing Sheets

(56) References Cited

U.S. PATENT DOCUMENTS

2014/0068736 A1* 3/2014 Agerstam ............. H04W 12/06
                                                            726/7
2015/0046832 A1* 2/2015 George ............... G06F 17/3089
                                                           715/744

* cited by examiner

FIG. 10

| | RELATIVE DISPLAY SIZE | TOUCH PANEL | SPEAKER | MICROPHONE | GPS | MOUSE | KEYBOARD TYPE |
|---|---|---|---|---|---|---|---|
| SMARTPHONE MANUFACTURED BY A | SMALL | YES | YES | YES | YES | NO | SW |
| TABLET PC MANUFACTURED BY B | SMALL | YES | YES | NO | NO | NO | SW |
| TABLET PC MANUFACTURED BY C | LARGE | YES | YES | YES | NO | NO | SW |
| PC MANUFACTURED BY D | LARGE | NO | NO | NO | NO | YES | HW |

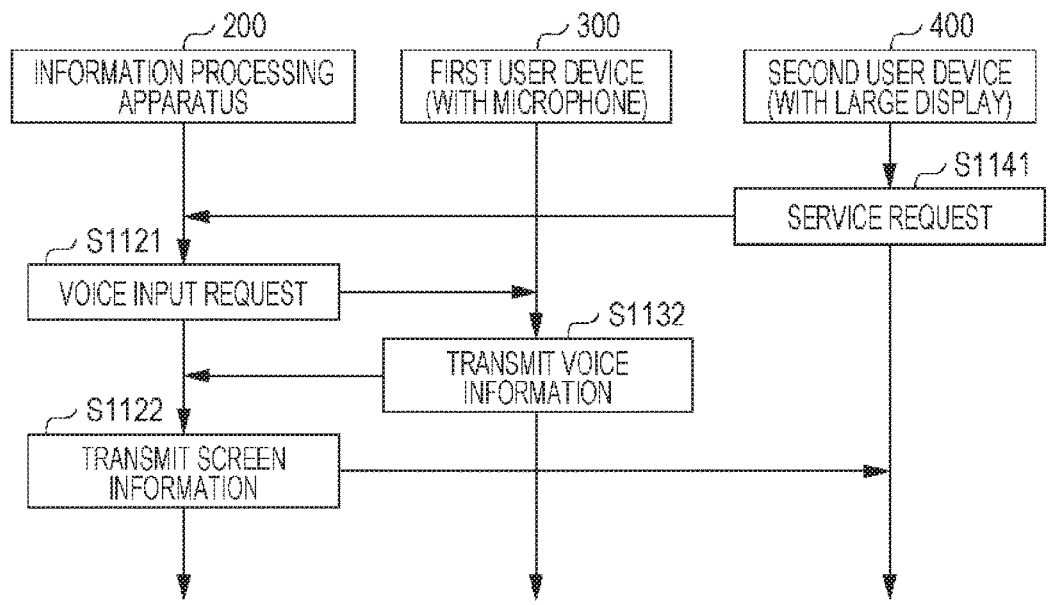

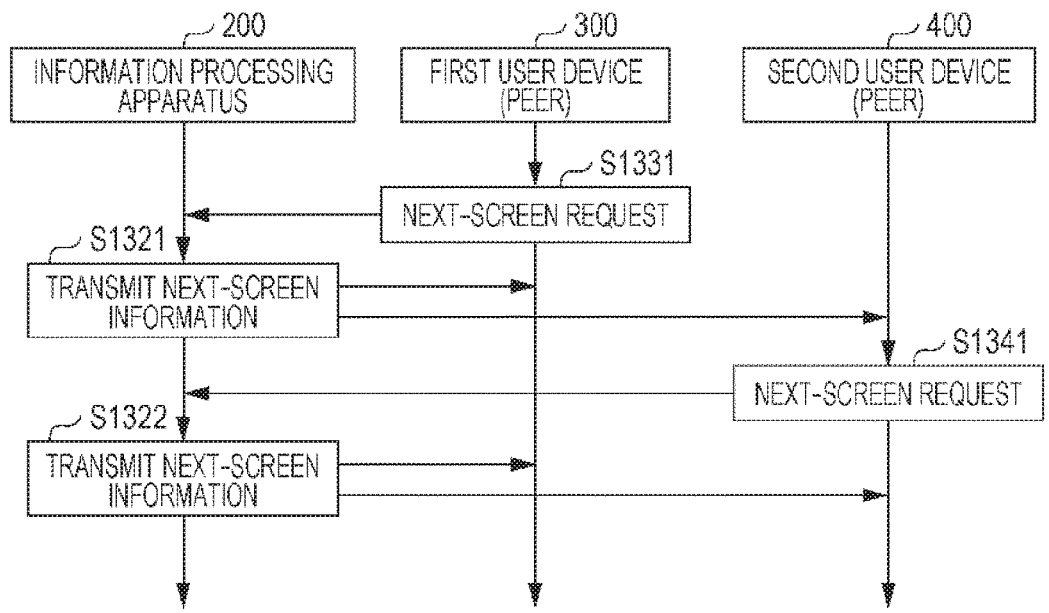
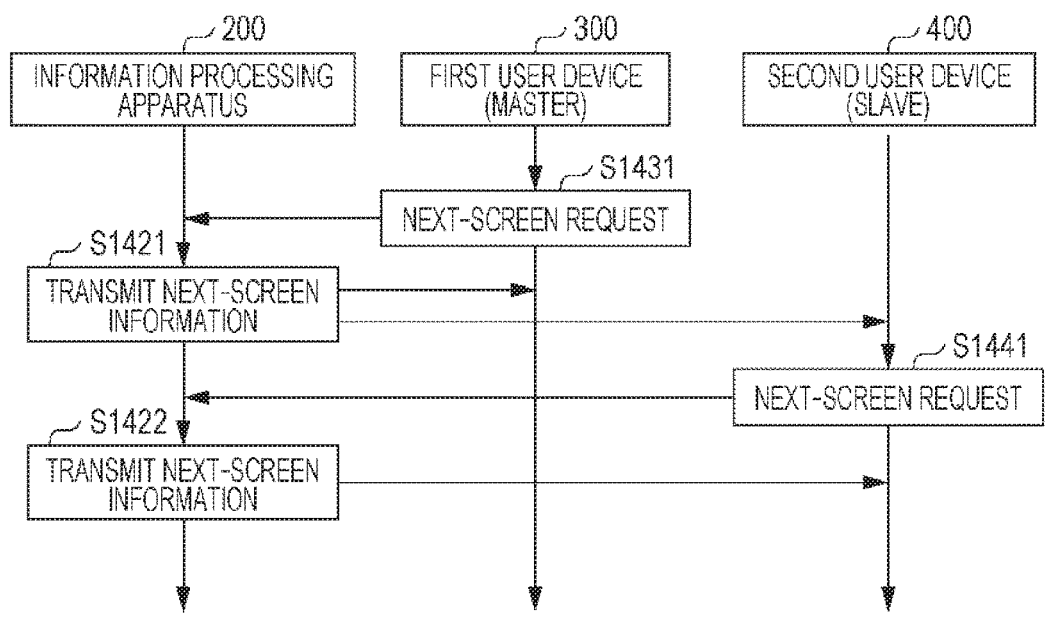

TRANSMITTING SERVICE INFORMATION TO A PLURALITY OF USER DEVICES USED BY A SINGLE USER

CROSS-REFERENCE TO RELATED APPLICATIONS

This application is a continuation of U.S. application Ser. No. 14/476,987 filed Sep. 4, 2014 which claims priority under 35 USC 119 from Japanese Patent Application No. 2014-055865 filed Mar. 19, 2014 including the specification, drawings and abstract is incorporated herein by reference in its entirety.

BACKGROUND (i) Technical Field

The present invention relates to an information processing apparatus, an information processing system, and a recording medium.

(ii) Related Art

Hitherto, there has been known a so-called server/client network service in which an information processing apparatus such as a personal computer (PC) that serves as a server provides information in response to a request from a user device such as a PC that serves as a client. In such a service, plural user devices occasionally receive a service from one information processing apparatus.

SUMMARY

According to an aspect of the present invention, there is provided an information processing apparatus including: a user determination unit that determines whether or not plural user devices are used by a single user on the basis of information transmitted from the plural user devices; a storage unit that stores information of the plural user devices determined to be used by the single user as a set of user devices; a selection unit that selects a second user device to which the service is to be provided in the case where a first user device that requests the service and the second user device are both included in the same set of user devices; and a transmitting unit that transmits service information to the first and the second user device.

BRIEF DESCRIPTION OF THE DRAWINGS

Exemplary embodiments of the present invention will be described in detail based on the following figures, wherein:

FIG. 10 is a table indicating a summary of the hardware properties for user device classifications.

FIG. 11 is a flowchart illustrating a process performed in an information processing system according to a ninth exemplary embodiment of the present invention;

FIG. 12 is a table indicating a summary of the master-slave relationship between user devices for combinations of user device classifications.

FIG. 13 is a flowchart illustrating a process performed in an information processing system according to a tenth exemplary embodiment of the present invention; and FIG. 14 is a flowchart illustrating a process performed in an information processing system according to an eleventh exemplary embodiment of the present invention.

DETAILED DESCRIPTION

Exemplary embodiments of the present invention will be described below with reference to the drawings.

First Exemplary Embodiment

Figure 1:
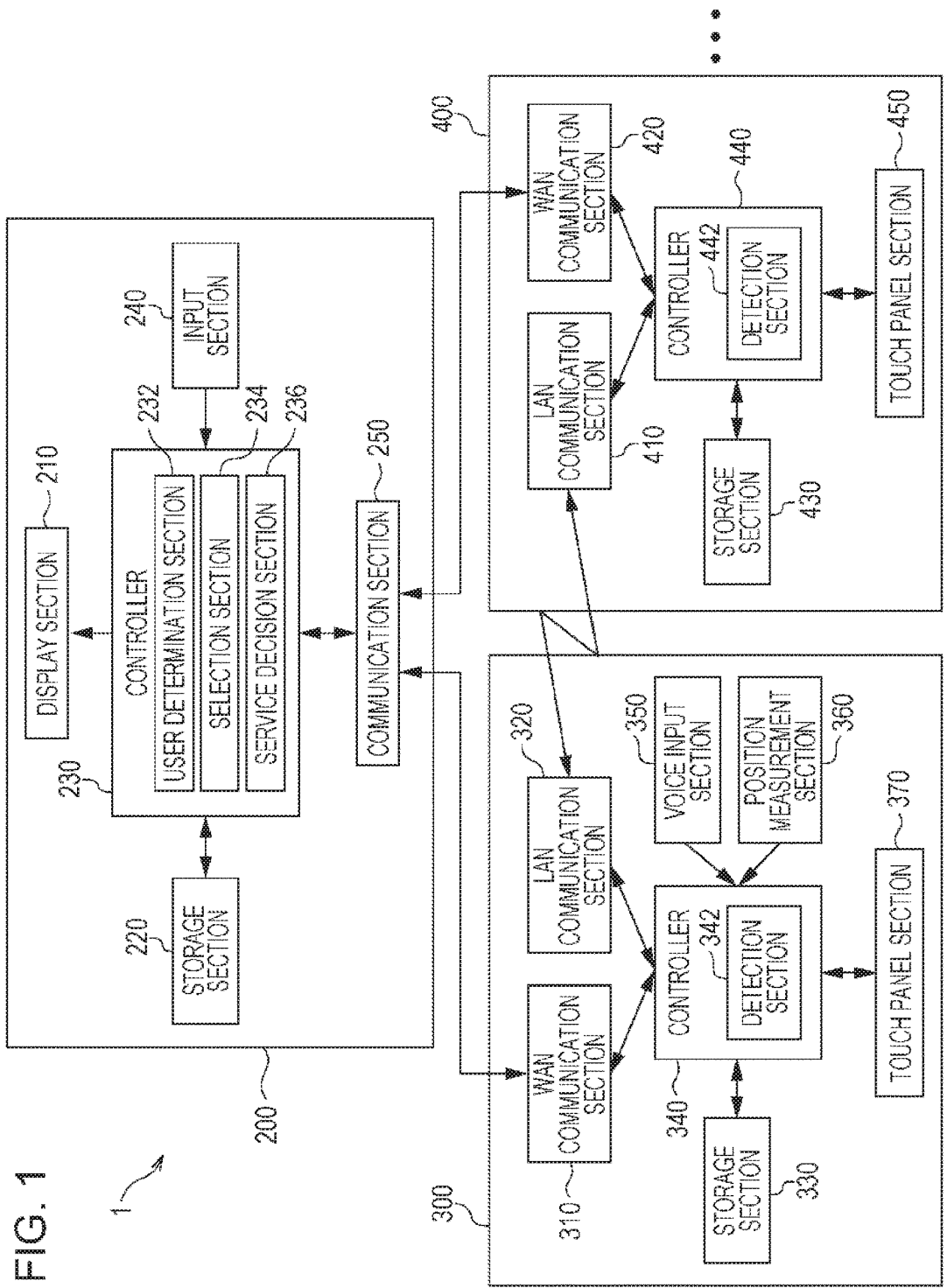
FIG. 1 is a functional block diagram of an information processing system according to a first exemplary embodiment of the present invention.

FIG. 1 is a functional block diagram of an information processing system 1 according to a first exemplary embodiment of the present invention. The information processing system 1 includes an information processing apparatus 200, a first user device 300, and a second user device 400. In FIG. 1, two user devices 300 and 400 are illustrated. However, the information processing system 1 may include three or more user devices.

The information processing apparatus 200 includes a display section 210, a storage section 220, a controller 230, an input section 240, and a communication section 250. The controller 230, the display section 210, the storage section 220, and the input section 240 are integrated with each other to function as a computer.

The display section 210 is a liquid crystal display, for example, and displays information or the like that is necessary to operate the information processing apparatus 200.

The storage section 220 includes a random access memory (RAM) and a read only memory (ROM), for example. The storage section 220 stores a program executed by the controller 230, and also functions as a work memory for the controller 230. The program stored in the storage section 220 and executed by the controller 230 may be provided via an electrical communication line, or may be provided as stored in a computer readable information storage medium such as a semiconductor storage element.

The controller 230 includes a central processing unit (CPU), for example, and executes the program stored in the storage section 220 to control the entire information processing apparatus 200. The controller 230 includes a user determination section 232, a selection section 234, and a service decision section 236. Control performed by the controller 230 will be described in detail later.

The input section 240 is a keyboard or a mouse, for example, and outputs an instruction from a user to the controller 230.

The communication section 250 is a network interface card for connection of the information processing apparatus 200 to a wide area network (WAN). The communication section 250 may be a wired communication device, or may be a wireless communication device.

The first user device 300 is a smartphone, for example, and includes a WAN communication section 310, a local area network (LAN) communication section 320, a storage section 330, a controller 340, a voice input section 350, a controller 360, and a touch panel section 370. The controller 340, the touch panel section 370, and the storage section 330 are integrated to function as a computer.

The WAN communication section 310 is similar to the communication section 250. The WAN communication section 310 is a network interface card for communication via the Internet between the user device 300 and the information processing apparatus 200.

The LAN communication section 320 is used exclusively for communication between the first user device 300 and the second user device 400. The LAN communication section 320 is a wireless LAN device, and includes a wireless communication device that uses a radio wave in a 2.4 GHz band, a so-called near field communication (NFC) device, or the like.

The configuration of the storage section 330 and the controller 340 is similar to the configuration of the storage section 220 and the controller 230, respectively, of the information processing apparatus 200. It should be noted, however, that the controller 340 of the first user device 300 includes a detection section 342. Control performed by the detection section 342 will be described in detail later.

The voice input section 350 is a microphone, for example. The voice input section 350 is used in the case where a user operates the user device 300 through voice operation. In addition, the voice input section 350 is also used for a call in the case where the first user device 300 is a smartphone by way of example, and a telephone function of the first user device 300 is used.

The position measurement section 360 is used to receive a radio wave signal including positional information. For example, the position measurement section 360 receives a satellite signal including positional information transmitted from a global positioning system (GPS) satellite or the like. The position measurement section 360 and the controller 340 cooperate with each other to calculate the position of the first user device 300.

The touch panel section 370 has a touch display superposed on the surface of a liquid crystal display or the like. A user of the first user device 300 touches an icon or the like displayed on the touch panel section 370 using a finger or a touch pen to operate the first user device 300. Although the user device 300 according to the exemplary embodiment has the touch panel section 370, the user device 300 may have a display section such as a liquid crystal display and an input section such as numeric keys provided separately from each other, for example.

The second user device 400 is a tablet personal computer (PC), for example, and includes a LAN communication section 410, a WAN communication section 420, a storage section 430, a controller 440, and a touch panel section 450. The controller 440, the touch panel section 450, and the storage section 330 are integrated with each other to function as a computer.

The LAN communication section 410, the WAN communication section 420, the storage section 430, the controller 440, and the touch panel section 450 of the second user device 400 are configured in the same manner as those of the user device 300.

In the exemplary embodiment, the first user device 300 which is a smartphone and the second user device 400 which is a tablet PC are included in the information processing system 1. Besides, a desktop PC, a feature phone, or the like may be included in the information processing system 1. The configuration of the first user device 300 and the second user device 400 is not limited to that according to the exemplary embodiment. The configuration of the first user device 300 and the second user device 400 may be changed as appropriate, and an optimum configuration may be selected in accordance with the service provided by the information processing apparatus 200.

Figure 2:
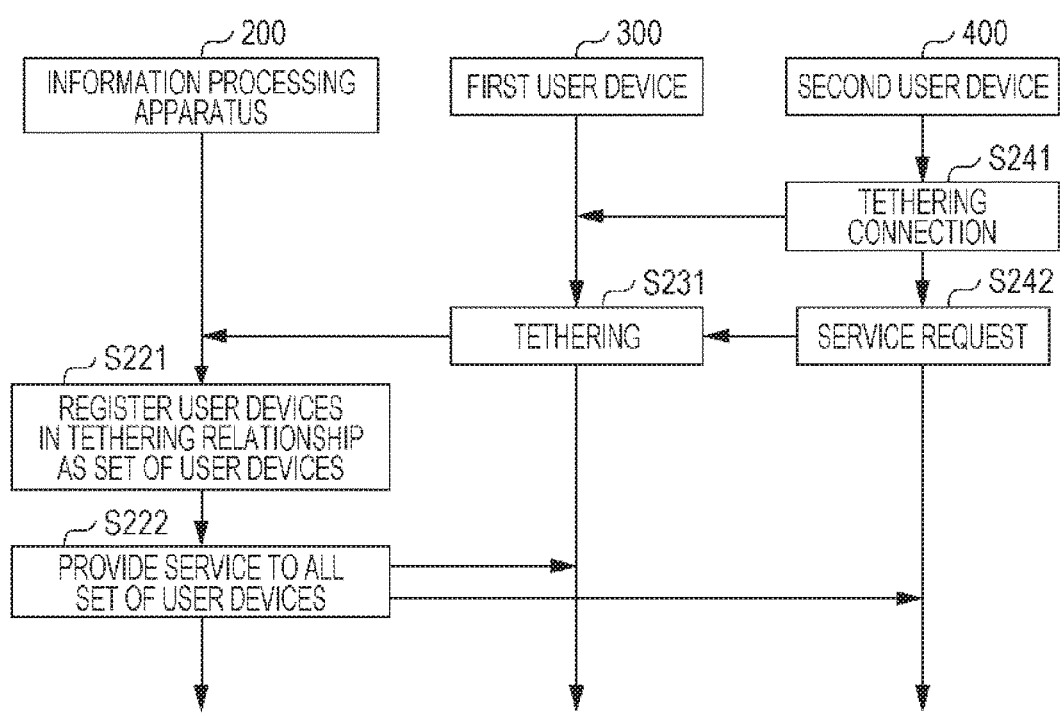
FIG. 2 is a flowchart illustrating a process performed in the information processing system according to the first exemplary embodiment of the present invention.

FIG. 2 is a flowchart illustrating a process performed in the information processing system 1 according to the first exemplary embodiment of the present invention. In FIG. 2, the arrows extending downward on the sheet surface indicate the temporal order of the processes, and the arrows extending transversely on the sheet surface indicate how information is transmitted and received between the devices.

In the exemplary embodiment, the second user device 400, which is a tablet PC by way of example, is connected to the first user device 300, which is a smartphone by way of example, through so-called tethering (S241) to be communicable with the information processing apparatus 200 via the first user device 300. Therefore, when the second user device 400 sends a service request to the information processing apparatus 200 (S242), information is delivered from the LAN communication section 410 to the LAN communication section 320, and information is delivered from the WAN communication section 310 to the communication section 250 (S231). In the information processing apparatus 200, the first user device 300 and the second user device 400 are recognized as a client having the same IP address.

The user determination section 232 determines that the first user device 300 and the second user device 400 (user devices in a tethering relationship) which transmit a single transmission origin address are used by the single user, and registers such user devices in the storage section 220 as a set of clients (S221). The user determination section 232 may determine that the user devices are used by the single user in the case where the user devices have the single transmission origin address and the address is assigned by a communication carrier.

The storage section 220 of the information processing apparatus 200 may store whether or not each user device has a tethering function, and the user determination section 232 may determine that the user devices are used by the single user in the case where the user devices have the single transmission origin address and at least one of the user devices has a tethering function.

Besides, in the case where plural user devices are connected to a router, it may be determined whether or not the plural user devices are used by the single user. Specifically, the hardware properties of the router may be determined, and it may be determined that the user devices having the single transmission origin address are used by the single user in the case where the router is a mobile router, for example.

The selection section 234 of the information processing apparatus 200 selects the user device (the first user device 300) included in the set of user devices and other than the second user device 400 which sent the service request as a user device to which a service is to be provided, and the information processing apparatus 200 provides the service to the first user device 300 and the second user device 400 (S222). In the exemplary embodiment, if the second user device 400 is operated, the service may be provided not only to the second user device 400 which sent the service request but also to the first user device 300 which is another user device that may be used by the user.

In the exemplary embodiment, one user device is connected to one user device through tethering. However, plural user devices may be connected to one user device through tethering. In addition, as discussed above, plural user devices may be connected to a mobile router.

Second Exemplary Embodiment

Figure 3:
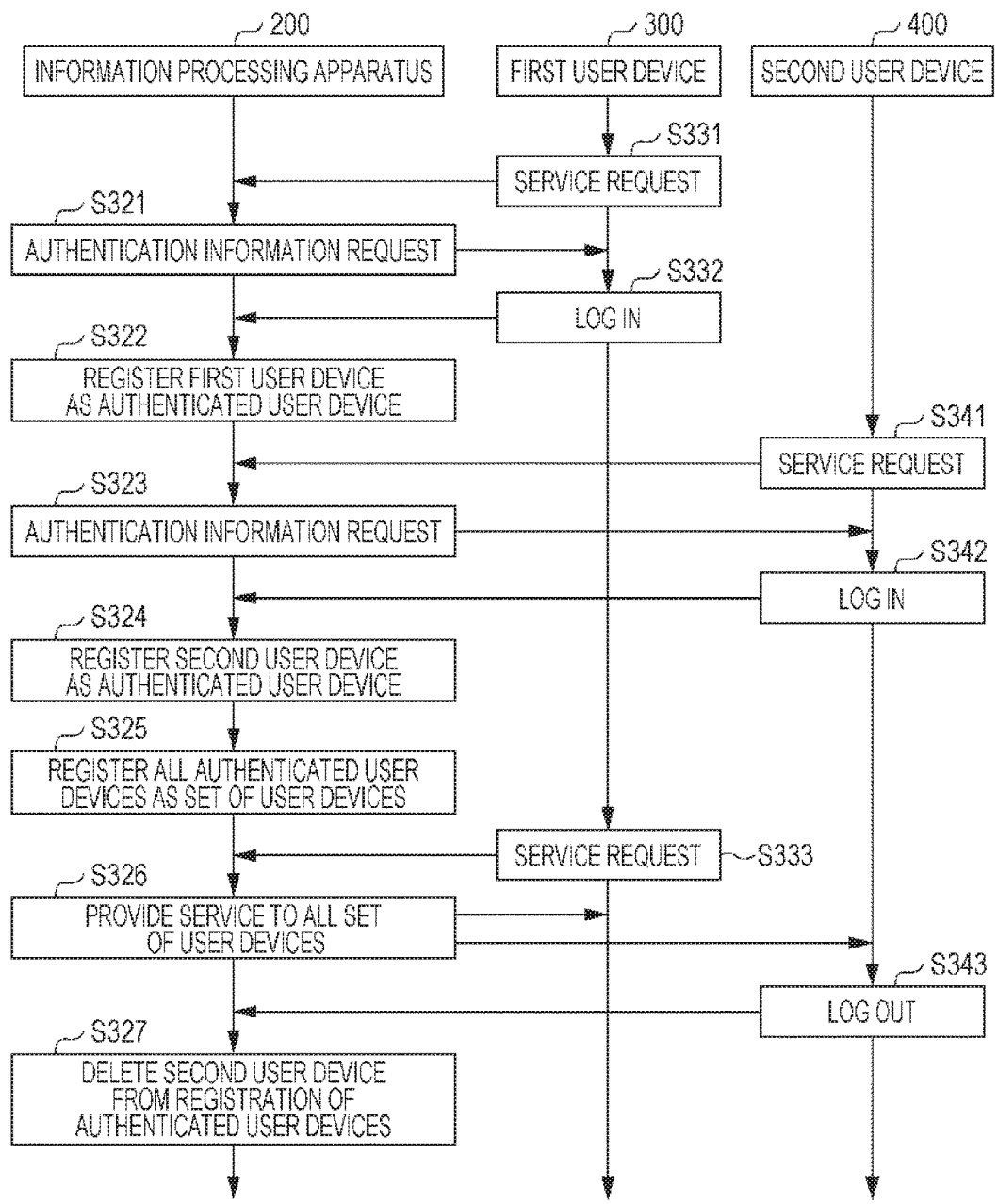
FIG. 3 is a flowchart illustrating a process performed in an information processing system according to a second exemplary embodiment of the present invention.

FIG. 3 is a flowchart illustrating a process performed in an information processing system 1 according to a second exemplary embodiment of the present invention. Also in the exemplary embodiment, the information processing system 1 has the configuration illustrated in FIG. 1.

First, the first user device 300 sends a service request to the information processing apparatus 200 (S331). In the exemplary embodiment, the information processing apparatus 200 which has received the service request requests authentication information for user authentication (S321). The information processing apparatus 200 requests authentication information by transmitting a log-in screen to a browser of the first user device 300, for example. The first user device 300 receives the authentication information request, and logs in (S332). In this event, it is desirable that information that is only known to the true user such as a password should be requested as the authentication information.

The information processing apparatus 200 which has received the authentication information from the first user device 300 registers the first user device 200 in the storage section 220 as an authenticated user device (S322). Such an authenticated user device is registered in the storage section 220 until the first user device 300 logs out.

Similar processes are performed also for the second user device 400. That is, the second user device 400 sends a service request to the information processing apparatus 200 (S341), the information processing apparatus 200 requests authentication information in response to the service request (S323), and the second user device 400 logs in (S342). Then, the second user device 400 is registered in the storage section 220 as an authenticated user device (S324).

The user determination section 232 references the authenticated user devices registered in the storage section 220, determines that all the authenticated user devices are used by the single user, and registers such user devices as a set of user devices (S325). In the case where plural users log in to the information processing apparatus 200, the users may be identified using the authentication information, and authenticated user devices to which the single user has logged in may be registered as a set of user devices.

After that, when the first user device 300 sends a service request to the information processing apparatus 200 (S333), the selection section 234 of the information processing apparatus 200 selects the user device (the second user device 400) included in the set of user devices and other than the first user device 300 which sent the service request as a user device to which a service is to be provided, and the information processing apparatus 200 provides the service to the first user device 300 and the second user device 400 (S326). Although the second user device 400 did not send a service request, the second user device 400 may receive the service from the information processing apparatus 200.

In the case where the service provided from the information processing apparatus 200 is not received, a log-out operation is performed. In the case of the exemplary embodiment, the second user device 400 logs out (S343). When information on the log out is received, the information processing apparatus 200 deletes from the storage section 220 information indicating that the second user device 400 is an authenticated user device. Consequently, even if the first user device 300 sends a service request to the information processing apparatus 200 thereafter, the service is provided only to the first user device 300, and not to the second user device 400.

Third Exemplary Embodiment

Figure 4:
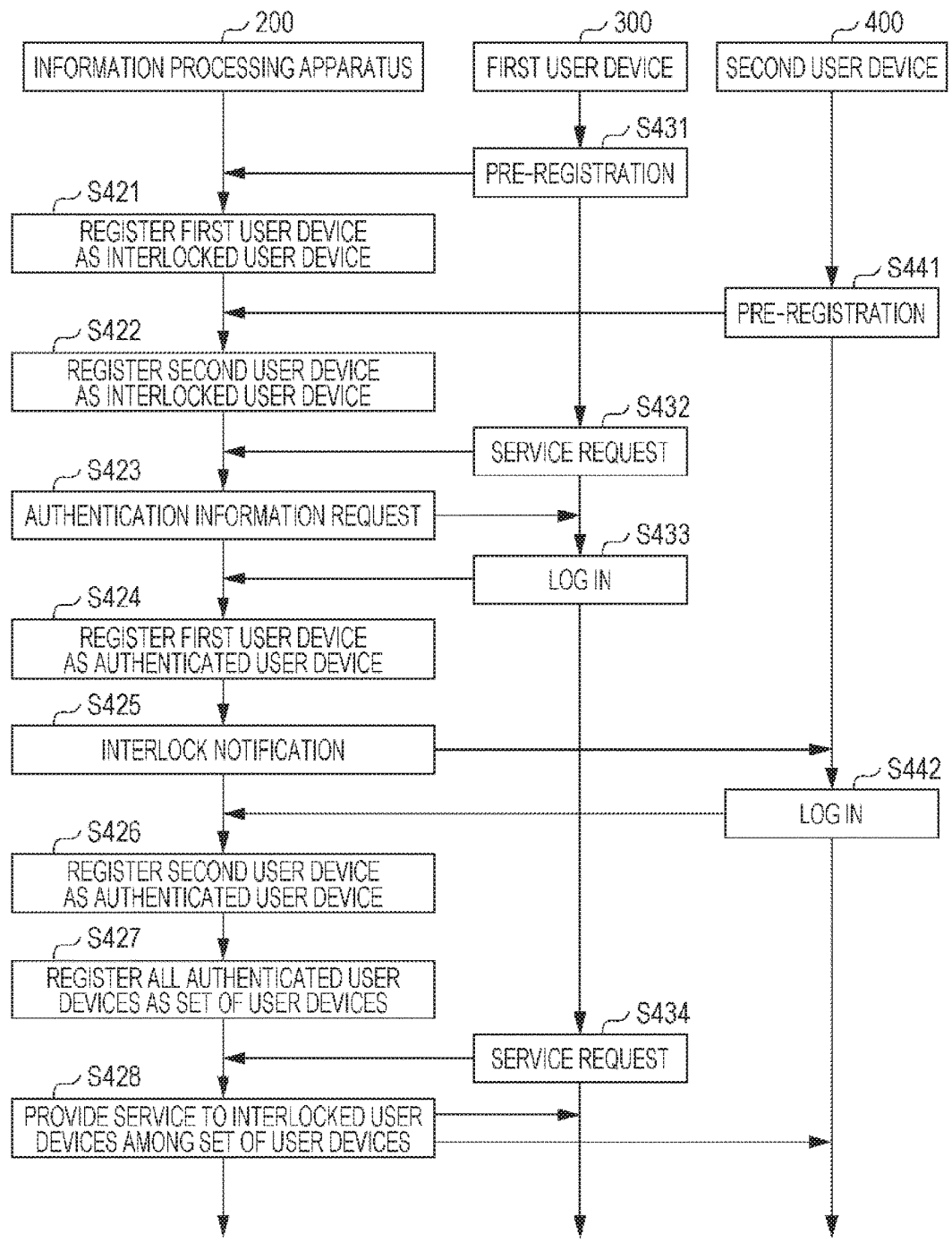
FIG. 4 is a flowchart illustrating a process performed in an information processing system according to a third exemplary embodiment of the present invention.

FIG. 4 is a flowchart illustrating a process performed in an information processing system 1 according to a third exemplary embodiment of the present invention. Also in the exemplary embodiment, the information processing system 1 has the configuration illustrated in FIG. 1.

In the exemplary embodiment, the first user device 300 is pre-registered (S431), and the second user device 400 is pre-registered (S441). When the pre-registration (S431) is performed, the first user device 300 is registered in the storage section 220 of the information processing apparatus 200 as an interlocked user device (S421). In addition, the second user device 400 is also registered in the same manner (S422). The first user device 300 and the second user device 400 are registered in association with each other. The term "interlocked user device" refers to a user device to which a service is to be provided in the case where a user device included in a set of user devices sends a service request to the information processing apparatus 200.

When a service request is sent from the first user device 300 (S432) after the pre-registration (S431 and S441), the information processing apparatus 200 requests authentication information (S423), and the first user device 300 logs in (S433), as in the case of the second exemplary embodiment. The first user device 300 is registered in the storage section 220 as an authenticated user device (S424).

After that, the information processing apparatus 200 sends an interlock notification to the user device (the second user device 400) other than the user device which has last logged in among all the interlocked user devices registered in the storage section 200 (S425). The term "interlock notification" refers to a notification that informs the user devices included in the set of user devices that a service may be provided.

When the interlock notification is received, the second user device 400 logs in (S442). The second user device 400 is registered in the storage section 220 as an authenticated user device (S426).

After that, the user determination section 232 determines that the first user device 300 and the second user device 400 are used by the single user, and registers such user devices in the storage section 220 as a set of user devices (S427).

In the case where a service request is received from the first user device 300 (S434), the selection section 234 of the information processing apparatus 200 selects the interlocked user device (the second user device 400) other than the first user device 300 which sent the service request as a user device to which a service is to be provided, and the information processing apparatus 200 provides the service to the first user device 300 and the second user device 400 (S428). In the case of the exemplary embodiment, the set of user devices are the first user device 300 and the second user device 400, and the interlocked user devices are also the first user device 300 and the second user device 400.

In the exemplary embodiment, a user device that is not pre-registered is not registered as an interlocked user device. Therefore, a service is not provided to the user device that is not pre-registered in an interlocked manner even if such a user device logs in to be registered as an authenticated user device, or even in the case where a user device included in the set of user devices sends a service request.

Fourth Exemplary Embodiment

Figure 5:
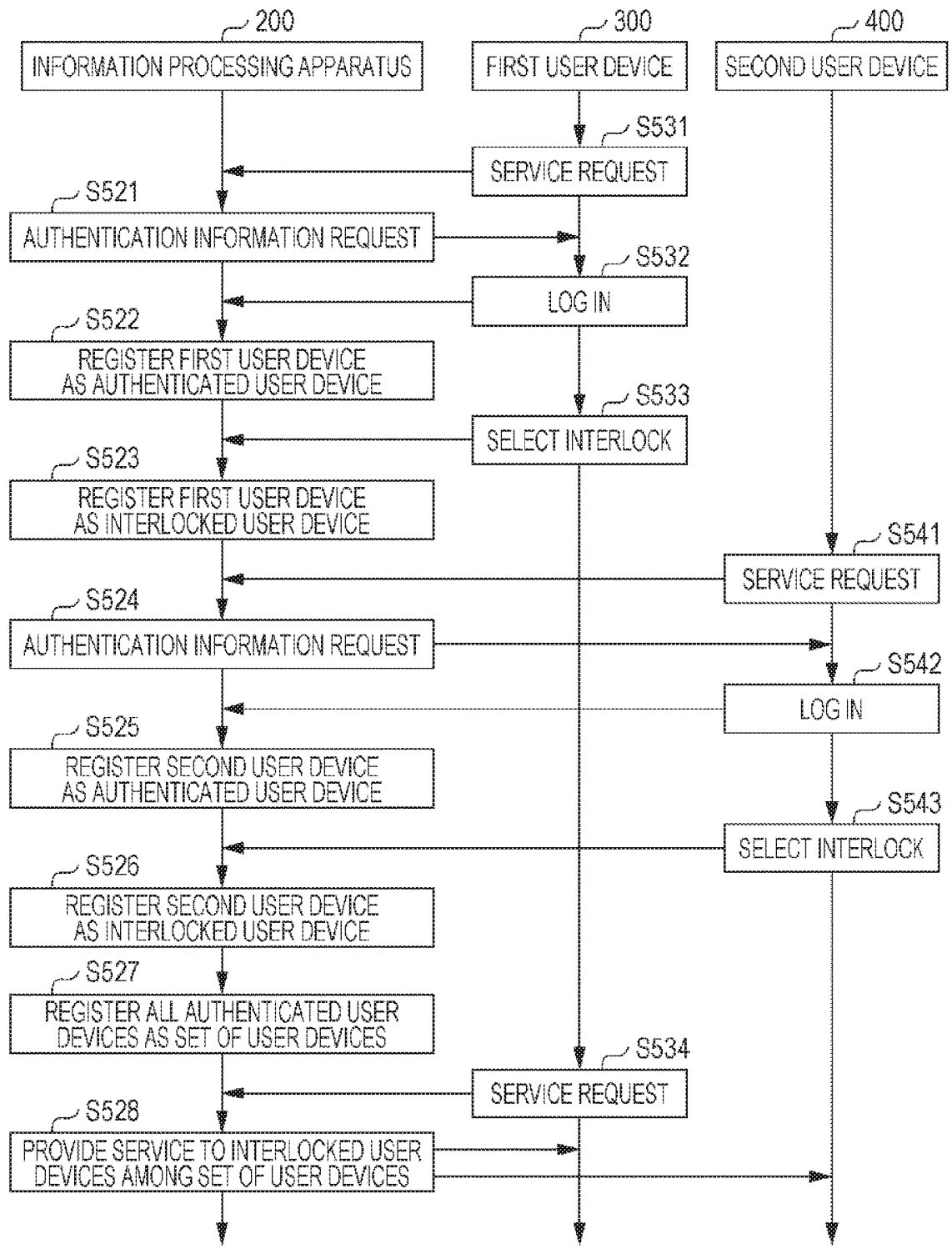
FIG. 5 is a flowchart illustrating a process performed in an information processing system according to a fourth exemplary embodiment of the present invention.

FIG. 5 is a flowchart illustrating a process performed in an information processing system 1 according to a fourth exemplary embodiment of the present invention. Also in the exemplary embodiment, the information processing system 1 has the configuration illustrated in FIG. 1.

Also in the exemplary embodiment, when a service request is sent from the first user device 300 (S531), the information processing apparatus 200 requests authentication information (S521), and the first user device 300 logs in (S532). The first user device 300 is registered in the storage section 220 as an authenticated user device (S522).

In the exemplary embodiment, subsequent to the log in, the first user device 300 performs an interlock selection (S533). The interlock selection transfers to the information processing apparatus 200 information indicating that the first user device 300 is registered as an interlocked user device. In the exemplary embodiment, unlike the pre-registration in the third exemplary embodiment, the interlock selection may be performed only after the log in.

When the interlock selection is performed by the first user device 300, the information processing apparatus 200 registers the first user device 300 in the storage section 220 as an interlocked user device (S523).

After that, similar processes are performed also for the second user device 400. That is, the second user device 400 sends a service request to the information processing apparatus 200 (S541), the information processing apparatus 200 requests authentication information (S524), and the second user device 400 logs in (S542). After that, information indicating that the second user device 400 is an authenticated user device is registered in the storage section 220 (S525), the second user device 400 performs an interlock selection (S543), and information indicating that the second user device 400 is an interlocked user device is registered in the storage section 220 (S526).

The user determination section 232 of the information processing apparatus 200 determines that all the authenticated user devices are used by the single user, and registers such user devices as a set of user devices (S527). After that, the selection section 234 of the information processing apparatus 200 selects the interlocked user device (the second user device 400) other than the first user device 300 which sent the service request as a user device to which a service is to be provided, and the information processing apparatus 200 provides the service to the first user device 300 and the second user device 400 (S528).

Also in the case of the exemplary embodiment, both the set of user devices and the interlocked user devices are the first user device 300 and the second user device 400. However, it is only necessary that the interlocked user devices should be included in the set of user devices, and the set of user devices and the interlocked user devices may not coincide with each other.

Fifth Exemplary Embodiment

Figure 6:
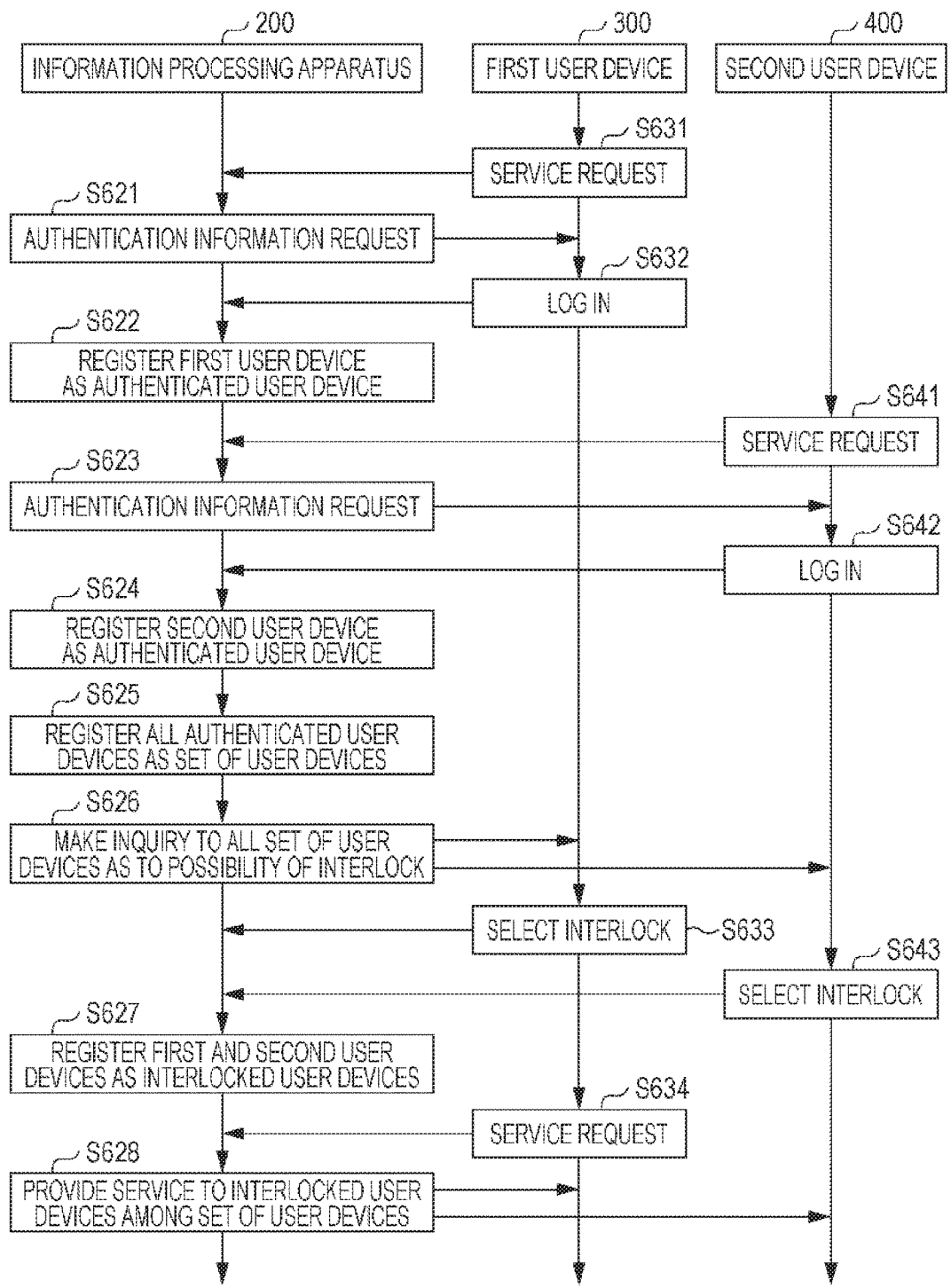
FIG. 6 is a flowchart illustrating a process performed in an information processing system according to a fifth exemplary embodiment of the present invention.

FIG. 6 is a flowchart illustrating a process performed in an information processing system 1 according to a fifth exemplary embodiment of the present invention. Also in the exemplary embodiment, the information processing system 1 has the configuration illustrated in FIG. 1.

Also in the exemplary embodiment, a log-in operation is first performed. That is, the first user device 300 sends a service request to the information processing apparatus 200 (S631), the information processing apparatus 200 requests authentication information (S621), and the first user device 300 logs in (S632). After that, the first user device 300 is registered in the storage section 220 as an authenticated user device (S622).

In addition, the second user device 400 sends a service request to the information processing apparatus 200 (S641), the information processing apparatus 200 requests authentication information (S623), and the second user device 400 logs in (S642). After that, the second user device 400 is registered in the storage section 220 as an authenticated user device (S624).

The user determination section 232 determines that all the authenticated user devices are used by the single user, and registers such user devices as a set of user devices (S625).

After that, the information processing apparatus 200 makes an inquiry to all the user devices included in the set of user devices as to whether or not a service is provided in an interlocked manner (S626). In response to the inquiry, the first user device 300 selects interlocked service provision (S633), and the second user device 400 also selects interlocked service provision (S643). The information processing apparatus 200 registers the first user device 300 and the second user device 400 in the storage section 220 as interlocked user devices (S626).

In the exemplary embodiment, unlike the third exemplary embodiment and the fourth exemplary embodiment, the information processing apparatus 200 actively makes an inquiry to the user devices as to the possibility of interlocked service provision.

When a service request is received from the first user device 300 (S634), the selection section 234 of the information processing apparatus 200 selects the interlocked user device (the second user device 400) other than the first user device 300 which sent the service request as a user device to which a service is to be provided, and the information processing apparatus 200 provides the service to the first user device 300 and the second user device 400 (S628). Also in the case of the exemplary embodiment, both the set of user devices and the interlocked user devices are the first user device 300 and the second user device 400. However, it is only necessary that the interlocked user devices should be included in the set of user devices, and the set of user devices and the interlocked user devices may not coincide with each other.

In addition, the information processing apparatus 200 may make an inquiry to the set of user devices as to the possibility of interlocked service provision at a timing other than after plural user devices log in. For example, the information processing apparatus 200 may make an inquiry to all the user devices included in the set of user devices as to the possibility of interlocked service provision when a service request is sent from a user device included in the set of user devices with the set of user devices registered.

Sixth Exemplary Embodiment

Figure 7:
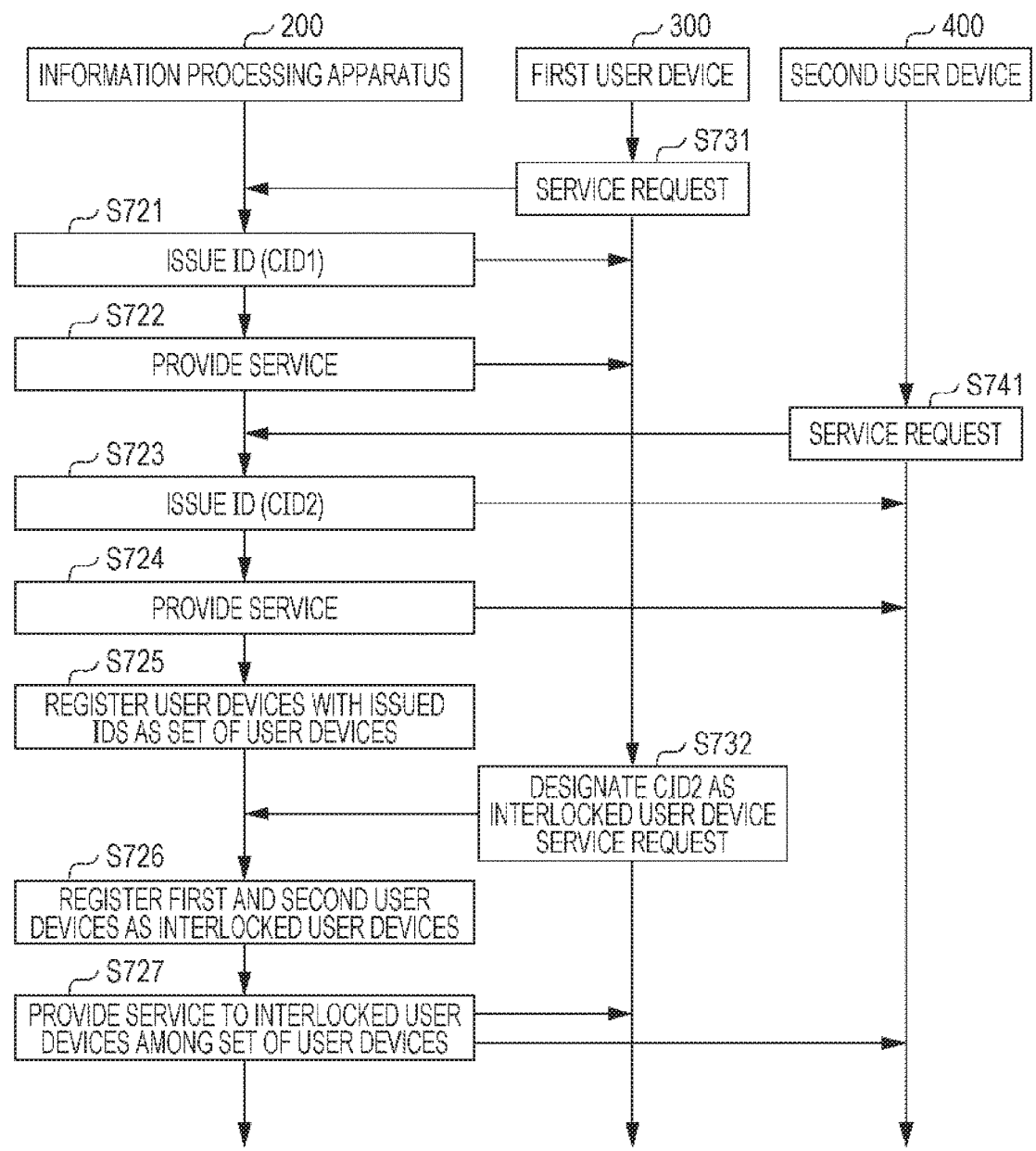
FIG. 7 is a flowchart illustrating a process performed in an information processing system according to a sixth exemplary embodiment of the present invention.

FIG. 7 is a flowchart illustrating a process performed in an information processing system 1 according to a sixth exemplary embodiment of the present invention. Also in the exemplary embodiment, the information processing system 1 has the configuration illustrated in FIG. 1.

In the exemplary embodiment, a log-in operation is not performed, but the first user device 300 sends a service request to the information processing apparatus 200 (S731). In response to the service request, the information processing apparatus 200 issues an ID (referred to as "CID1") for identification of the first user device 300 (S721), and provides a service to the first user device 300 (S722).

Also, when a service request is sent from the second user device 400 (S741), the information processing apparatus 200 issues an ID (referred to as "CID2") for identification of the second user device 400 (S723), and provides a service to the second user device 400 (S724).

After that, the user devices provided with an ID issued by the information processing apparatus 200 send a service request to the information processing apparatus 200 along with the issued ID. For example, the first user device 300 sends a service request to the information processing apparatus 200 along with the ID CID1 included in a cookie. The ID serves as specific identification information for identification of a user device in the processes performed by the information processing apparatus 200.

The user determination section 232 of the information processing apparatus 200 determines that the user devices with the issued ID are used by the single user, and registers such user devices as a set of user devices (S725). In the case of the exemplary embodiment, CID1 and CID2 are the issued IDs, and the first user device 300 and the second user device 400 are registered as a set of user devices.

After that, the first user device 300 sends a service request to the information processing apparatus 200 along with information designating CID2 as an interlocked user device (S732). For example, the first user device 300 makes such a designation by including its own ID CID1 in a cookie and also including CID2 in the cookie.

In the exemplary embodiment, the IDs issued by the information processing apparatus 200 are received by the true user of the user devices. Thus, only the user that may use both the first user device 300 and the second user device 400 may have a knowledge of the IDs (CID1 and CID2) assigned to both the user devices.

When a service request designating CID2 as an interlocked user device is received, the information processing apparatus 200 first registers the first user device 300 and the second user device 400 in the storage section 220 as interlocked user devices (S726). After that, the selection section 234 selects the interlocked user device (the second user device 400) other than the first user device 300 which sent the service request, among the user devices included in the set of user devices, as a user device to which a service is to be provided. The information processing apparatus 200 provides the service to the first user device 300 and the second user device 400 (S727).

In the exemplary embodiment, an interlocked user device is designated at the same time as a service request is sent. However, an interlocked user device may be designated in advance. In addition, the issued IDs may be impartially rendered invalid after a certain period elapses. In the case where a service request is not sent from a user device included in the set of user devices for a certain period, the ID assigned to the user devices included in the set of user devices may be rendered invalid.

Seventh Exemplary Embodiment

Figure 8:
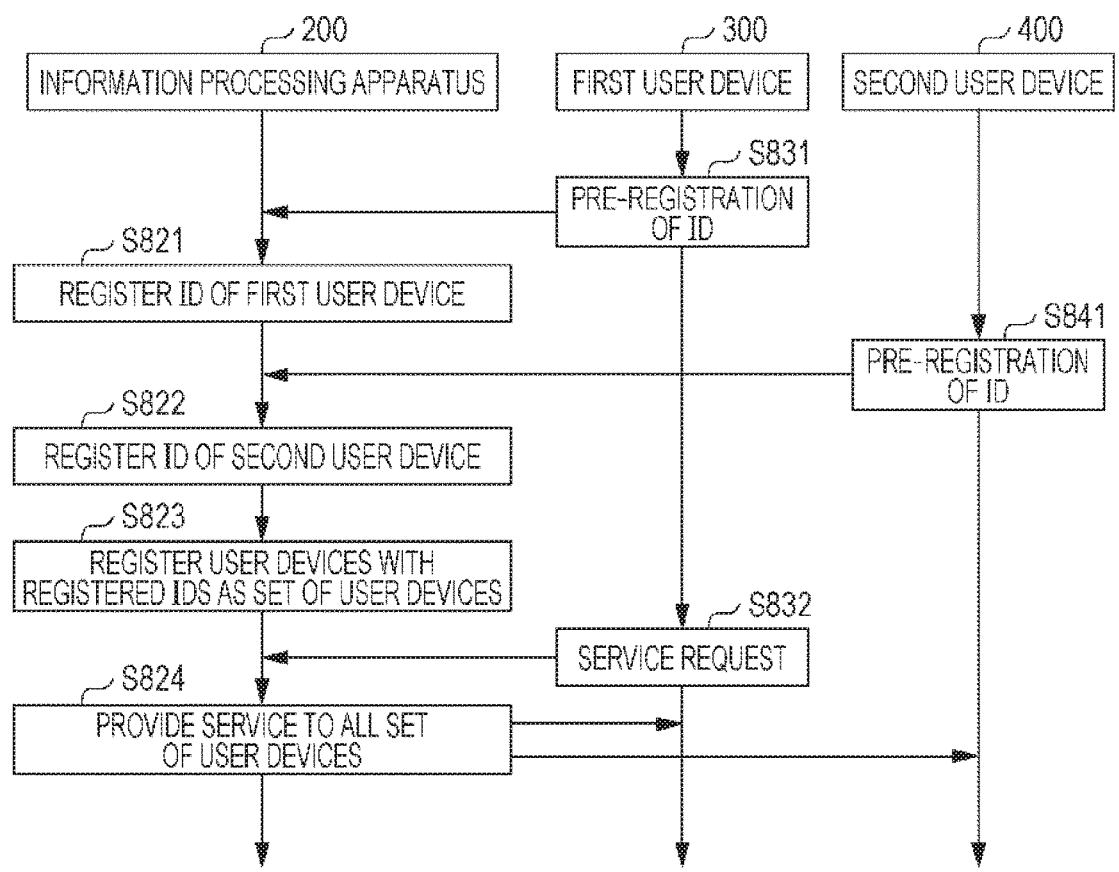
FIG. 8 is a flowchart illustrating a process performed in an information processing system according to a seventh exemplary embodiment of the present invention.

FIG. 8 is a flowchart illustrating a process performed in an information processing system 1 according to an eighth exemplary embodiment of the present invention. Also in the exemplary embodiment, the information processing system 1 has the configuration illustrated in FIG. 1.

In the exemplary embodiment, an ID assigned to a user device is registered in advance. Examples of the ID include an international mobile equipment identifier (IMEI) and an international mobile subscriber identity (IMSI). These are specific identification information for identification of user devices themselves and users that use the user devices.

In the exemplary embodiment, the first user device 300 pre-registers an ID in the information processing apparatus 200 (S831). In response to the pre-registration, the information processing apparatus 200 registers the ID of the first user device 300 in the storage section 220 (S821).

Similarly, the second user device 400 pre-registers an ID (S841), and the information processing apparatus 200 registers the ID of the second user device 400 in the storage section 220 in response to the pre-registration (S822).

After that, the user determination section 232 of the information processing apparatus 200 determines that the user devices with the registered IDs are used by the single user, and registers such user devices as a set of user devices (S823).

When a service request is received from the first user device 300 (S832), the selection section 234 of the information processing apparatus 200 selects the user device (the second user device 400) other than the first user device 300 which sent the service request, among the user devices included in the set of user devices, as a user device to which a service is to be provided. Consequently, the information processing apparatus 1 provides the service to all the user devices included in the set of user devices (S824).

In the exemplary embodiment, IMEIs and IMSIs are used as the IDs. Besides, IDs assigned to individual devices by manufacturers of the user devices or IDs assigned by communication carriers to identify individual users may also be used.

Eighth Exemplary Embodiment

Figure 9:
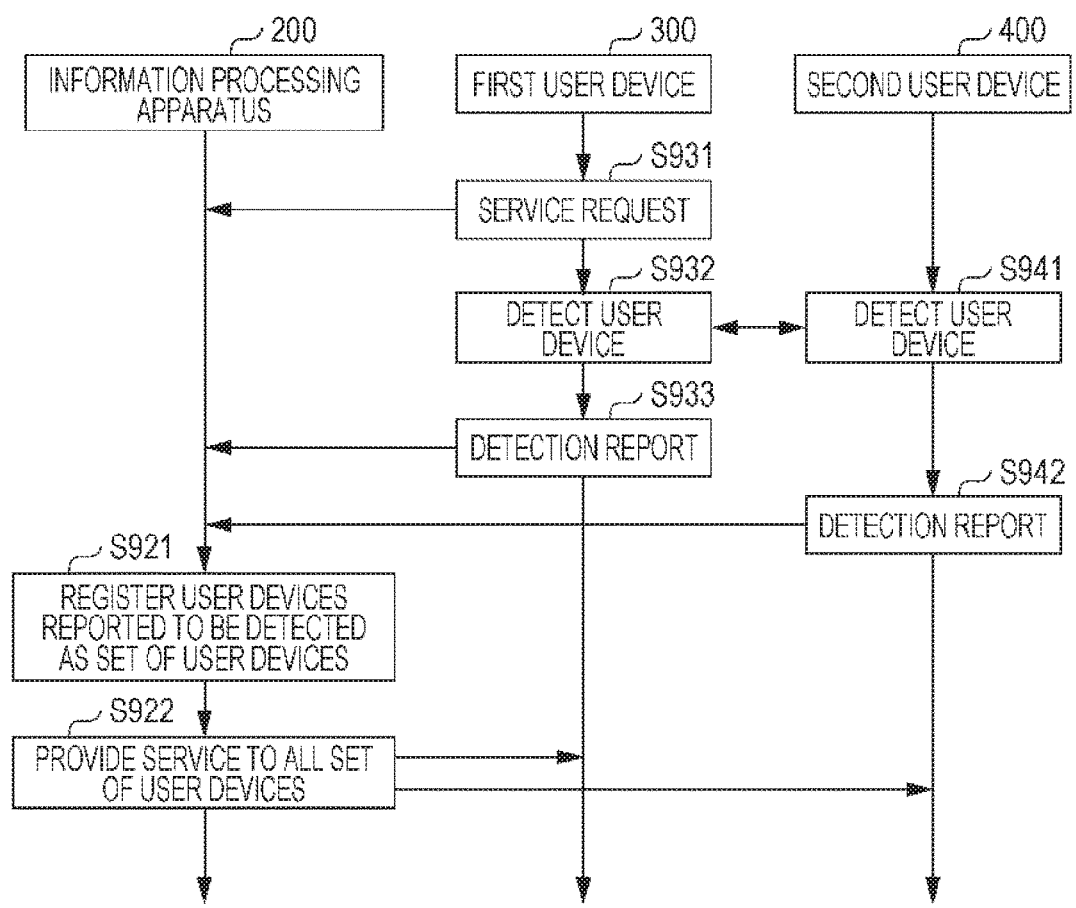
FIG. 9 is a flowchart illustrating a process performed in an information processing system according to an eighth exemplary embodiment of the present invention.

FIG. 9 is a flowchart illustrating a process performed in an information processing system 1 according to an eighth exemplary embodiment of the present invention. Also in the exemplary embodiment, the information processing system 1 has the configuration illustrated in FIG. 1.

In the exemplary embodiment, first, the first user device 300 sends a service request to the information processing apparatus 200 (S931). For example, a program incorporated in a web browser of the first user device 300 is started, and the detection section 342 is used to detect user devices that are communicable with each other (S932). The detection section 342 controls the LAN communication section 320 so as to detect a user device that is communicable with the first user device 300 through a LAN. For example, in the case where the LAN communication section 320 is an NFC device, the detection section 342 detects a user device that is physically close to (for example, within a radius of several tens of centimeters from) the first user device 300. If plural user devices located physically close to each other are detected, it may be estimated that the plural user devices are used by the single user.

In the case where the detection section 342 of the first user device 300 detects the second user device 400, a detection section 442 of the second user device 400 also detects the first user device 300 (S941). The detection section 442 of the second user device 400 controls the LAN communication section 410 so as to detect the first user device 300 that is communicable through a LAN.

When a communicable user device is detected, the first user device 300 reports to the information processing apparatus 200 on having detected the second user device 400 (S933). In addition, the second user device 400 reports to the information processing apparatus 200 on having detected the first user device 300 (S942).

When the detection report is received, the user determination section 232 of the information processing apparatus 200 determines that the first user device 300 and the second user device 400 mentioned in the detection reports are used by the single user, and registers such user devices in the storage section 220 as a set of user devices (S921).

After that, the selection section 234 of the information processing apparatus 200 selects the interlocked user device (the second user device 400) included in the set of user devices and other than the first user device 300 which sent the service request as a user device to which a service is to be provided, and the information processing apparatus 200 provides the service to the first user device 300 and the second user device 400 (S922).

In the exemplary embodiment, detection of user devices is triggered by a service request sent by the first user device 300. However, detection of user devices may be performed in advance. For example, in the case where the LAN communication sections 320 and 410 are NFC devices, user devices may be brought physically close to each other to detect the user devices in advance, and a detection report may be sent to the information processing apparatus 200. In this case, it is not necessary to bring the user devices physically close to each other when receiving a service provided from the information processing apparatus.

Ninth Exemplary Embodiment

FIG. 10 is a table indicating a summary of the hardware properties for user device classifications. The storage section 220 of the information processing apparatus 200 according to a ninth exemplary embodiment stores information indicated in FIG. 10. The table illustrated in FIG. 10 indicates a summary of the hardware properties, such as the relative display size, whether or not the device has a touch panel, whether or not the device has a speaker, whether or not the device has a microphone, whether or not the device has a global positioning system (GPS), whether or not the device has a mouse, and the keyboard type, for user device classifications such as a smartphone manufactured by A, a tablet PC manufactured by B, a tablet PC manufactured by C, and a PC manufactured by D. The table illustrated in FIG. 10 is exemplary, and the number of registered user device classifications and the number of registered hardware properties may be determined as desired.

For example, the smartphone manufactured by A has a display section with a size of about the palm of a hand, which is smaller than the display section of the tablet PC manufactured by C and the PC manufactured by D. In addition, the smartphone manufactured by A has a touch panel section, a sound output section (speaker), a voice input section (microphone), and a GPS position measurement section. However, the smartphone manufactured by A does not have a mouse, and has a software (SW) keyboard rather than a hardware (HW) keyboard.

In the case where a service request is received from a user device, the selection section 234 of the information processing apparatus 200 selects a user device other than the user device which sent the service request as a user device to which a service is to be provided by the method described in relation to the first to eighth exemplary embodiments. Then, the information processing apparatus 220 references the information stored in the storage section 220 to determine the user device classification to which the user device which sent the service request belongs and the user device classification to which the user device selected by the selection section 234 belongs. In order to determine the user device classification of a user device, so-called user agent information included in the hypertext transfer protocol (HTTP) header, for example, may be used. The user agent information includes the type of the user device (such as smartphone manufactured by A and tablet PC manufactured by B) which sent the HTTP request, the web browser name, and the operating system (OS) name. Therefore, the information processing apparatus 200 may read the user agent information to determine which user device classifications the user device which sent the service request and the user device selected by the selection section 234 belong to.

When the user device classifications to which the user device which sent the service request and the user device selected by the selection section 234 belong are determined, the service decision section 236 of the information processing apparatus 200 decides the content of service information to be transmitted and the transmission destination of the service information on the basis of the combination of the user device classifications to which the first and the second user device belongs, respectively.

For example, for a combination between a user device A that belongs to the user device classification of smartphone manufactured by A and a user device C that belongs to the user device classification of tablet PC manufactured by C, it is conceivable to acquire positional information from the user device A having a GPS position measurement section, and display a map on the user device C with a relatively large display size. In this case, the service decision section 236 acquires positional information from the user device A, and decides map information as the content of service information, and decides the user device C as the transmission destination of the service information. In this case, the map information may also be transmitted to the user device A so that the user device A displays a detailed map with a user device B displaying a wide-area map, or so that an upper-level layer of a three-dimensional map may be displayed on the user device A with the user device B displaying a lower-level layer of the three-dimensional map.

FIG. 11 is a flowchart illustrating a process performed in the information processing system 1 according to the ninth exemplary embodiment of the present invention. The first user device 300 belongs to the user device classification of smartphone manufactured by A, and has a microphone. The second user device 400 is a tablet PC manufactured by C, and has a display with a relatively large size.

In the flowchart illustrated in FIG. 11, the first user device 300 and the second user device 400 are registered in advance in the storage section 220 as a set of user devices, and registered as interlocked user devices. In addition, the user device classifications to which the user devices belong are registered in the storage section 220. When a service request for a service that requires voice input is sent from the second user device 400 to the information processing apparatus 200 (S1141), the selection section 234 selects the first user device 300 as a destination to which the service is to be provided. The information processing apparatus 200 determines the user device classification to which the second user device 400 as the user device which sent the service request belongs and the user device classification to which the first user device 300 as the selected user device belongs. Then, the service decision section 236 decides the content of service information, which is a voice input request, and the transmission destination of the service information, which is the first user device 300, and sends a voice input request to the first user device 300 (S1121). When the request is received, the first user device 300 displays information that prompts the user to input voice, and transmits input voice information to the information processing apparatus 200 (S1132). When the voice information is received, the information processing apparatus 200 transmits screen information on a next screen to the second user device 400 with a relatively large display on the basis of the input voice (S1122).

In the case where the user device A which belongs to the user device classification of smartphone manufactured by A having a speaker and a user device D which belongs to the user device classification of PC manufactured by D having a relatively large display are registered as a set of user devices, for example, sound information may be transmitted to the user device A to cause the user device A to reproduce the sound information, and movie information may be transmitted to the user device D to cause the user device D to reproduce the movie information.

In the exemplary embodiment, the information processing apparatus 200 determines the user device classification to which the user device which sent a service request belongs and the user device classification to which the user device selected by the selection section 234 belongs. However, pre-registration used in the third exemplary embodiment may be adopted, and user device classifications may be registered during the pre-registration to be referenced in the case where a service request is sent.

In the exemplary embodiment, the service decision section 236 decides the content of service information to be transmitted and the transmission destination of the service information on the basis of the combination of the user device classifications to which the first and the second user device belongs, respectively. However, the content of service information and the transmission destination of the service information may be stored in advance in the storage section 220 for each combination of user device classifications, for example. In this case, contents may be prepared for each combination of user device classifications to allow a user to select a content.

Tenth Exemplary Embodiment

FIG. 12 is a table indicating a summary of the master-slave relationship between user devices for combinations of user device classifications. The drawing illustrates an example of the master-slave relationship between user devices, and the settings of the master-slave relationship may be changed by a manager of the information processing apparatus 200.

In the exemplary embodiment, for a combination of smartphone manufactured by A (second row) and tablet PC manufactured by B (third column), for example, the smartphone manufactured by A is of a dominant class (master), and the tablet PC manufactured by B is of a subordinate class (slave). For a combination of devices that belong to the same user device classification such as a combination of smartphone manufactured by A (second row) and smartphone manufactured by A (second column), the devices are determined to be of the same class (peers).

In the exemplary embodiment, a user device having a GPS position measurement unit, a sound input/output unit, or a display unit with a high resolution is preferentially determined to be of a dominant class. What user device with what hardware properties is determined to be of a dominant class may be changed in accordance with the content of a service to be provided.

FIG. 13 is a flowchart illustrating a process performed by an information processing system 1 according to a tenth exemplary embodiment of the present invention. In the flowchart illustrated in FIG. 13, the first user device 300 and the second user device 400 are registered in advance in the storage section 220 as a set of user devices.

In the exemplary embodiment, the first user device 300 and the second user device 400 are of the same class (peers). Therefore, in the case where the first user device 300 and the second user device 400 are provided with a web service through a web browser, an operation performed by one of the user devices is also reflected in the other user device. For example, if a request for a next screen is sent from the web browser of one of the user devices, not only the web browser of the user device which sent the request but also the web browser of the other user device is updated to the next screen.

That is, when a request for a next screen (service request) is sent from the first user device 300 to the information processing apparatus 200 (S1331), the selection section 234 of the information processing apparatus 200 selects the second user device 400, which is the user device included in the set of user devices and other than the user device which sent the service request, as a user device to which a service is to be provided. Then, the user device classification to which the first user device 300 belongs and the user device classification to which the second user device 400 belongs are determined to determine the master-slave relationship in accordance with the rules indicated in FIG. 12. In the exemplary embodiment, the first user device 300 and the second user device 400 are determined to be of the same class (peers). Consequently, next-screen information with the same content is transmitted to the first user device 300 and the second user device 400 (S1321). In the case where a request for a next screen is sent from the second user device 400 (S1341), the selection section 234 selects the first user device 300, and transmits next-screen information with the same content to the first user device 300 and the second user device 400 (S1322).

Eleventh Exemplary Embodiment

FIG. 14 is a flowchart illustrating a process performed by an information processing system 1 according to an eleventh exemplary embodiment of the present invention. In the exemplary embodiment, the first user device 300 and the second user device 400 are registered in advance in the storage section 220 as a set of user devices.

In the exemplary embodiment, the first user device 300 is of a dominant class (master), and the second user device 400 is of a subordinate class (slave). Therefore, in the case where the first user device 300 and the second user device 400 are provided with a web service through a web browser, an operation performed by the user device of the dominant class is reflected in the user device of the subordinate class, but not vice versa. For example, if a request for a next screen is sent from the web browser of the user device of the dominant class, not only the web browser of the user device of the dominant class which sent the request but also the web browser of the user device of the subordinate class is updated to the next screen. If a request for a next screen is sent from the web browser of the user device of the subordinate class, on the other hand, only the web browser of the user device of the subordinate class is updated, and the web browser of the user device of the dominant class is not updated.

That is, when a request for a next screen (service request) is sent from the first user device 300 to the information processing apparatus 200 (S1431), the selection section 234 of the information processing apparatus 200 selects the second user device 400, which is the user device included in the set of user devices and other than the user device which sent the service request, as a user device to which a service is to be provided. Then, the user device classification to which the first user device 300 belongs and the user device classification to which the second user device 400 belongs are determined to determine the master-slave relationship in accordance with the rules indicated in FIG. 12. In the exemplary embodiment, the first user device 300 is determined to be of a dominant class (master), and the second user device 400 is determined to be of a subordinate class (slave). Consequently, next-screen information with the same content is transmitted to the first user device 300 and the second user device 400 (S1421). In the case where a request for a next screen is sent from the second user device 400 (S1441), the information processing apparatus 200 transmits next-screen information only to the second user device 400 because the second user device 400 is of the subordinate class (slave) (S1422).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory; and
a processor coupled to the memory, wherein the processor is configured to execute:
    a receiving unit configured to receive authentication information from a plurality of user devices;
    a user determination unit configured to determine whether or not a first user device and a second user device, among the plurality of user devices, are used by a single user using the authentication information transmitted from the plurality of user devices;
    an interlock notification unit configured to inform the second user device when the receiving unit receives the authentication information of the first user device;
    a selection unit configured to select the second user device to which a service is to be provided when it is determined that the first user device and the second user device are simultaneously logged-in to the information processing apparatus; and
    a transmitting unit configured to transmit service information corresponding to the service to the first user device and the second user device.

2. An information processing apparatus according to claim 1,
wherein the interlock notification unit is configured to inform the second user device as to whether or not the service is provided in an interlocked manner, when the receiving unit receives the authentication information of the first user device.

* * * * *